United States Patent [19]

Pass et al.

[11] 3,957,334
[45] May 18, 1976

[54] PRINTED CIRCUIT BOARD ARRAY FOR CARD READER

[75] Inventors: Raymond Vincent Pass, Camp Hill; Daniel Joseph Crowley, Harrisburg, both of Pa.

[73] Assignee: AMP Incorporated, Harrisburg, Pa.

[22] Filed: Jan. 14, 1975

[21] Appl. No.: 541,026

[52] U.S. Cl. .............................. 339/75 MP; 200/46
[51] Int. Cl.² ..................... H01H 43/08; H05K 1/07
[58] Field of Search ......... 200/46; 339/17 L, 75 MP

[56] References Cited
UNITED STATES PATENTS

| | | | |
|---|---|---|---|
| 2,858,515 | 10/1958 | Thunander et al. | 339/17 LC |
| 2,941,054 | 6/1960 | Willis | 200/46 |
| 2,978,666 | 4/1961 | McGregor | 339/75 MP |
| 3,022,481 | 2/1962 | Stepoway | 339/17 L |
| 3,352,981 | 11/1967 | Ekers | 200/46 |
| 3,470,360 | 9/1969 | Rust et al. | 200/46 |

*Primary Examiner*—Roy Lake
*Assistant Examiner*—Neil Abrams
*Attorney, Agent, or Firm*—Gerald K. Kita

[57] ABSTRACT

The invention relates to a card reader and to a novel connector for a plurality of printed circuit boards. In the connector a plurality of dielectric laminates are bonded together with electrical contacts arranged in rows. Printed circuit boards are insertable within pockets formed by the laminates. The spring contacts engage edges of the printed circuit boards. Elastomeric strips are compressed internally in the pockets to bias the contacts into electrical engagement with the printed circuit boards without a need for soldering the contacts to the boards. In the card reader, a read head incorporates the described connector and is mounted for displacement toward and away from an apertured encoded card. Displacement of the read head is produced by rotation of a shaft on which are mounted eccentric cams. The read head is provided with follower blocks which engage the surface of the cams. Upon rotation of the cams the cam followers are required to shift and allow the desired displacement of the read head toward and away from the card being read.

1 Claim, 12 Drawing Figures

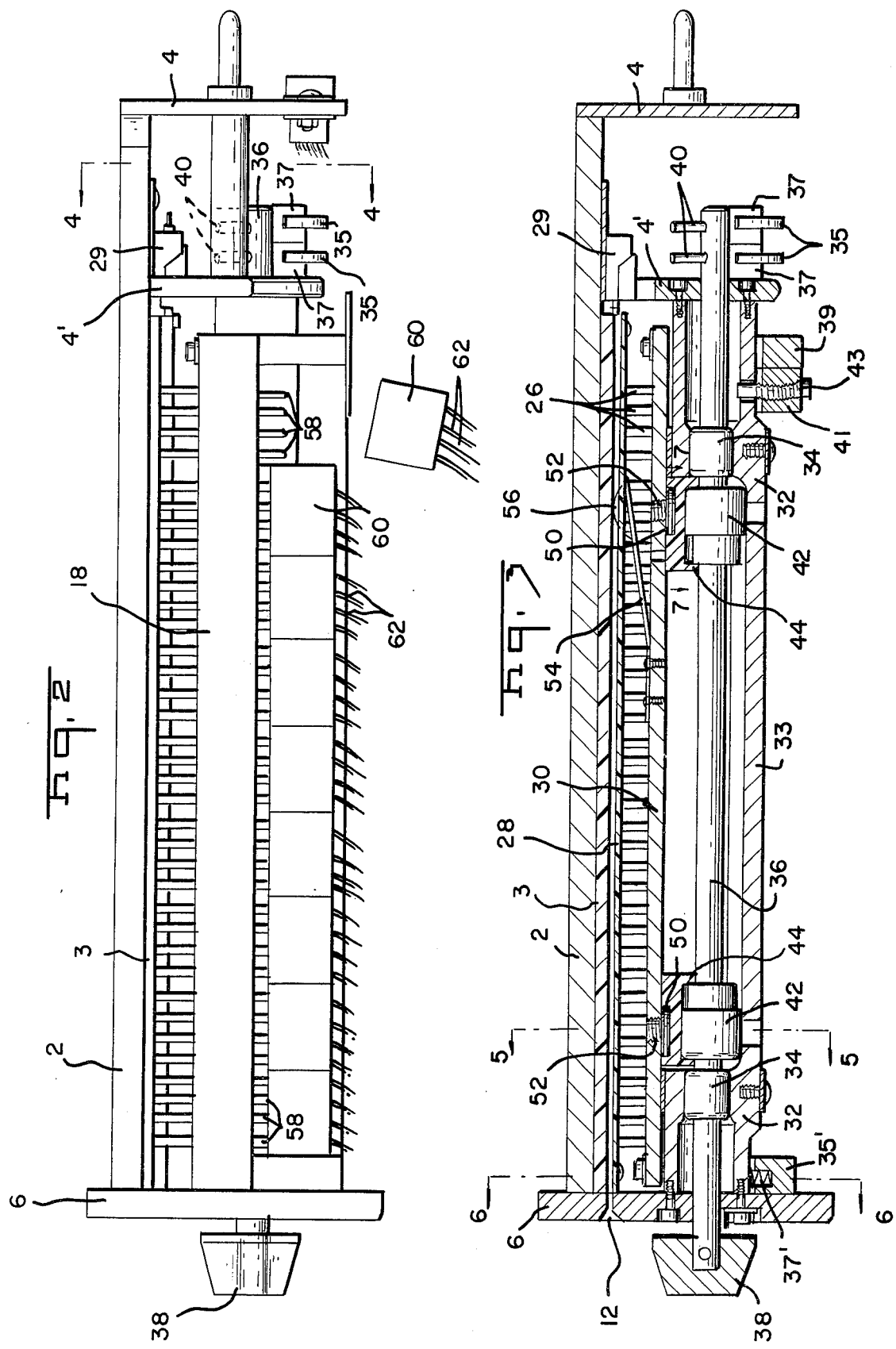

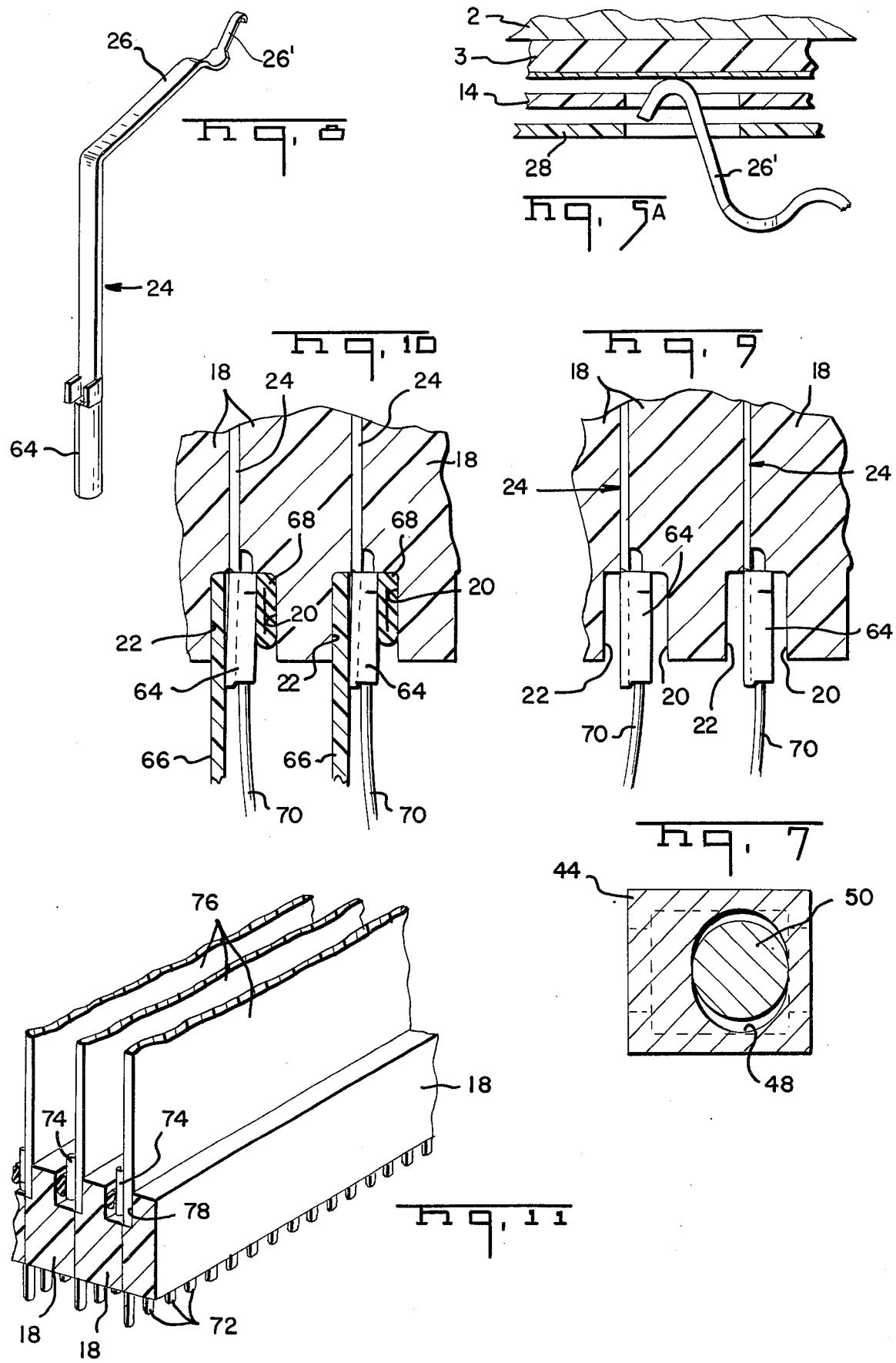

PRINTED CIRCUIT BOARD ARRAY FOR CARD READER

BACKGROUND OF THE PRIOR ART

In the prior art, electrical contact between the read head contacts and the printed circuit board was made by separate connector assembly means. Formed metal contact members containing inherent spring arms at one end and solderable tabs at the other are attached to the printed circuit pads by solderable means. The spring ends are contained in a semi-flexible housing for positional alignment. The semi-flexible housing contains openings for a plurality of the formed contacts thus providing a separate connector assembly means as part of the printed circuit board. This semi-flexible connector was then pluggably connected to formed cylindrical barrel parts of the read head contacts. In other applications the contacts are soldered directly to the circuit paths when the inherent spring characteristics of the contacts are insufficient to provide contact pressure. In the present invention, the contacts within the connectors are biased by a length of elastomeric compressible material.

BRIEF DESCRIPTION OF THE INVENTION

A connector for a plurality of printed circuit boards is fabricated by laminating a plurality of dielectric strips. Rows of elongated electrical contacts are sandwiched between laminated strips and have extended portions providing pluggable electrical terminals. The dielectric strips cooperate to provide a plurality of receptacles or pockets for pluggably receiving edges of corresponding printed circuit boards. The rows of contacts include relatively wide portions which protrude into the receptacles for contact electrically on the circuit paths of the printed circuit boards. A compressible elastomeric strip within each of the receptacles resiliently biases the contacts into pressure engagement on the circuit paths in order to establish completed electrical circuits.

The present invention also includes a card reader having a read head displaceable toward and away from an apertured encoded card. The read head incorporates a connector according to the present invention permitting printed circuit boards in the read head. The desired displacement of the read head is produced by mounting the read head on a rotatable shaft on which are mounted eccentric cams. The read head includes cam followers which are forced to traverse over the cams upon rotation thereof to create the desired displacement of the read head toward and away from the apertured card to be read. By utilizing cam followers with relatively large areas of contact on the surface of the cam the amplitude of read head displacement may be controlled within precise limits. Rotation of the shaft is utilized to perform other functions such as activating switches for supplying voltage to the read head.

OBJECTS

It is therefore an object of the present invention to provide a connector for a plurality of printed circuit boards utilizing laminated dielectric strips having rows of embedded contacts for engaging the printed circuit boards and for providing electrical terminals for connection externally of the connector.

Another object of the present invention is to provide an electrical connector fabricated from laminated dielectric strips with electrical contacts arranged in rows and embedded in the dielectric strips, the dielectric strips providing receptacles for receipt of printed circuit board edges therein and compressible elastomeric strips within the receptacles for resiliently biasing the contacts into pressure engagement on the circuit paths of the circuit boards.

Another object of the present invention is to provide a card reader having a read head displaceable toward and away from an encoded apertured card, with the read head being mounted over a rotatable shaft provided with eccentric rollers received in cam followers which are forced to traverse over a substantial surface area of the cam rollers to thereby displace the read head toward and away from the apertured card.

Another object of the present invention is to provide a card reader having a read head fabricated with a plurality of dielectric strips laminated together, with rows of electrical contacts embedded in the dielectric strips, the strips further providing receptacles receiving printed circuit boards therein, and with resiliently compressible dielectric strips within the receptacles resiliently biasing the contacts into pressure engagement on the circuit paths of the printed circuit board.

Other objects and many attendant advantages of the present invention will become apparent from the following detailed description taken in conjunction with the accompanying drawings.

DESCRIPTION OF THE DRAWINGS

FIG. 2 is an enlarged side elevation of the preferred embodiment shown in FIG. 1;

FIG. 3 is an enlarged cross-section taken along the line 3—3 of FIG. 1;

FIGS. 5 and 5A are fragmentary enlarged crossections taken along the line 5—5 of FIG. 3;

FIG. 7 is an enlarged section taken along the line 7—7 of FIG. 3;

FIG. 8 is an enlarged perspective of a contact utilized in the connector and read head according to the present invention;

FIGS. 9 and 10 are enlarged fragmentary sections of portions of the connector according to the present invention; and FIG. 11 is a fragmentary perspective of a connector according to the present invention.

DETAILED DESCRIPTION OF THE PREFERRED EMBODIMENTS

Figure 1:
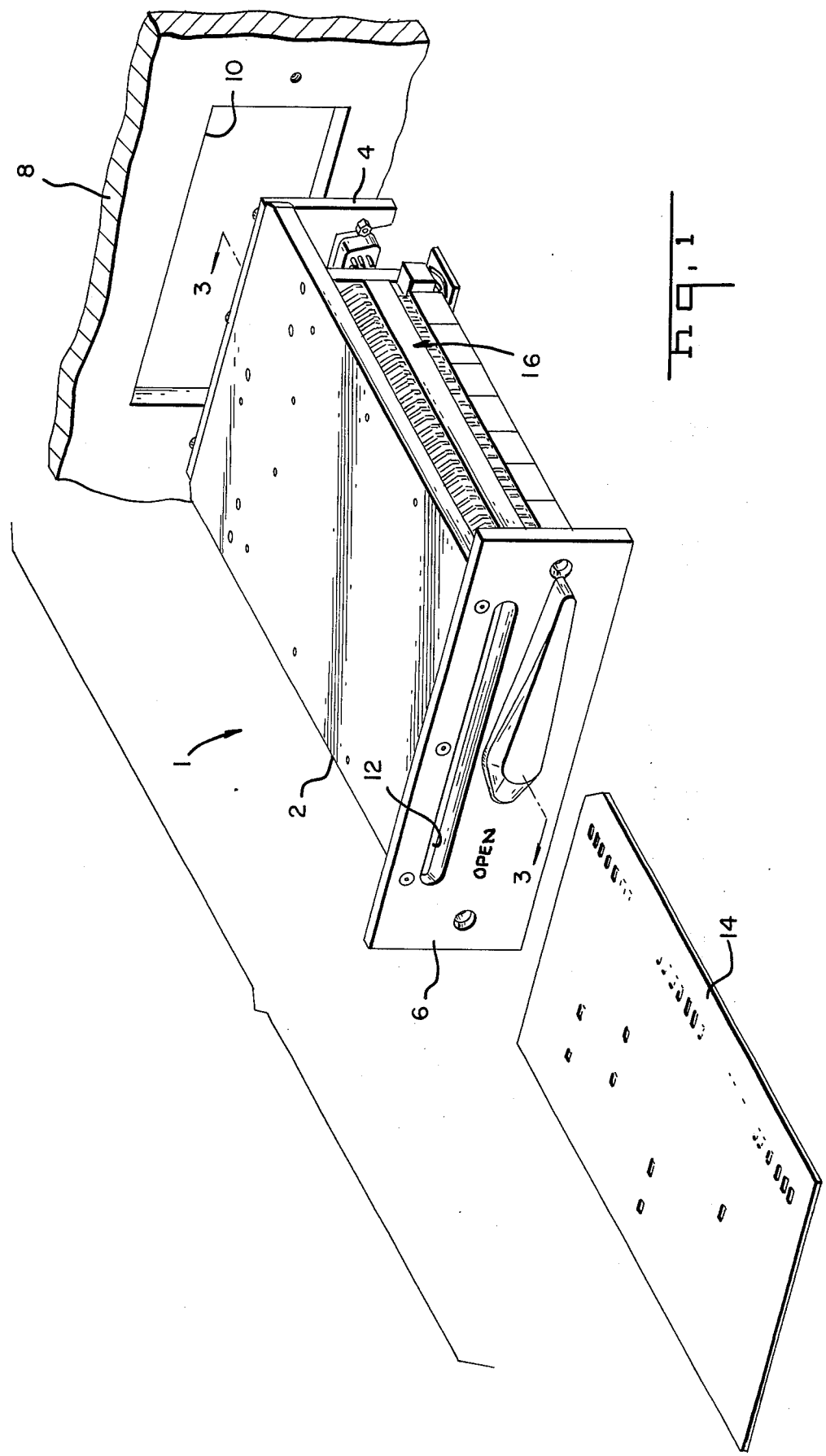
FIG. 1 is a fragmentary perspective with parts illustrated in exploded configuration of a preferred embodiment of a card reader according to the present invention.
Figure 4:
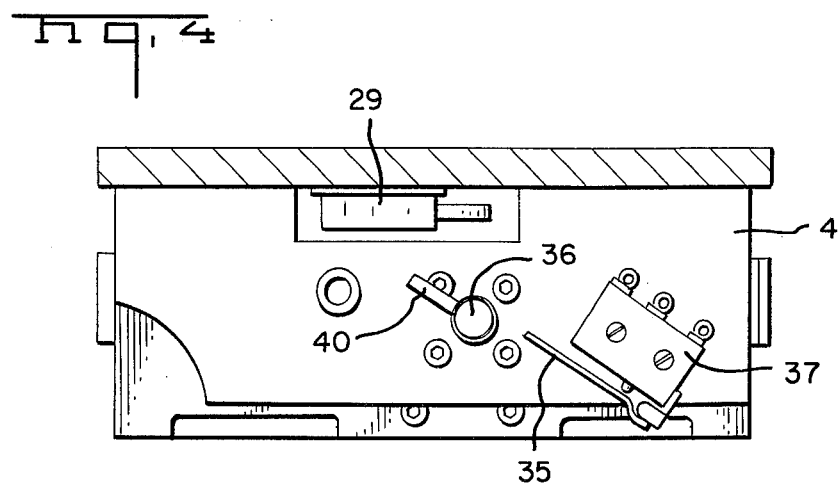
FIG. 4 is an enlarged cross-section taken along the line 4—4 of FIG. 2.

With more particular reference to FIG. 1 of the drawings, there is shown generally at 1 a preferred embodiment of a card reader having a base portion 2, an end plate 4 and a front end plate 6. The card reader is mountable in a bulk head 8 having an aperture 10 of a size sufficient to accept the card reader therein with the front end plate 6 overlying and in abutment against the bulk head 8. The front end plate 6 includes an elongated slot 12 into which an apertured card 14 may be inserted for reading. The card 14 is apertured selectively to provide an encoding or reading device in the well-known manner.

Figure 5:
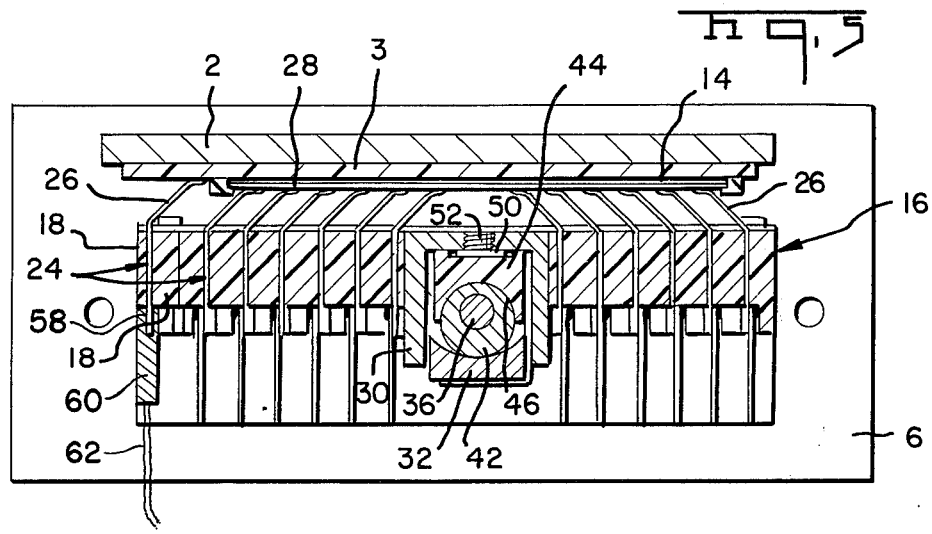

With more particular reference to FIGS. 2 and 3 taken in conjunction with FIG. 1, the base plate 2 is advantageously in the form of a structural plate having attached to it a printed circuit board having plated paths thereon. A read head generally shown at 16 includes a plurality of elongated dielectric bars or rails 18 generally of rectangular cross-section and provided with elongated cut out portions 20 and 22. The bars or rails 18 are laminated together. Between the laminated bars are sandwiched rows of contacts 24, the medial portions of the contacts 24 being held in place between pairs of bars 18. First end portions 26 of the contacts project outwardly of the laminated bars to provide resilient cantilever leaf spring contacts which project toward the card 14 which is inserted into the card reader as shown in FIG. 5. As shown in FIG. 5A, movement of the read head 16 toward the card 14 and also toward the printed circuit board 3 causes the contact portions 26' to be received through the apertures of the card 14 for contact on corresponding circuit paths 3' of the printed circuit board 3. The selective location of the apertures on the card 14 thereby provide a code which is read by the contacts of the card reader. As shown particularly in FIG. 5 the printed circuit board 3 is advantageously provided thereover with an overlying second printed circuit board 28 providing a card guide means and having apertures therein corresponding in number and in positions with the number and positions of the contacts 26. As the contacts 26 are received through the apertured card 14 they will also enter through corresponding apertures of the second circuit board 28, the apertures guiding the corresponding leaf spring contacts for desired engagement on desired locations on the printed circuit board 3.

Figure 6:
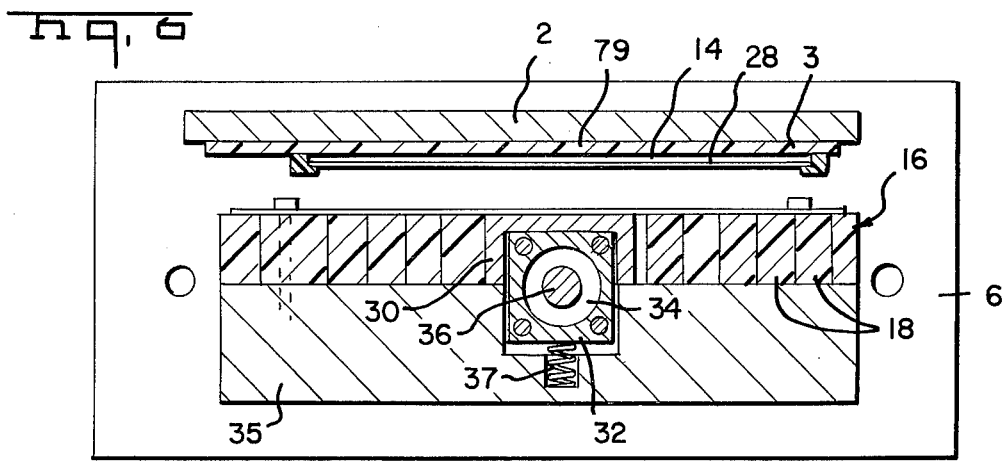
FIG. 6 is an enlarged cross-section taken along the line 6—6 of FIG. 3.

The mechanism for displacing the read head toward and away from the card 14 and the printed circuit board 3 is illustrated more particularly in FIGs. 3, 5, and 6. The dielectric bars 16 are laminated or otherwise secured to a central inverted channel 30. A pair of spaced bearing blocks 32 containing needle bearings 34 therein are mounted for rotation of shaft 36 in the bearings 34. One end of the shaft 36 projects outwardly through the front end plate 6 and is provided on the end thereof with a lever arm 38 which is utilized to rotate the shaft in a manner to be described in detail. The other end of the shaft 36 protrudes through an inner plate 4' and is provided with a pair of radially projecting pins 40. The pins 40 engage switch levers 35 of switches 37 which electrically activate the "read" circuit. The circuit is activated only when the shaft 36 has been rotated sufficiently to displace the read head fully toward the card to be read and thereby in a fully closed position. The switches 37 thus prevent circuit activation until the shaft is fully turned to a position closing the read head.

As shown more particularly in FIGS. 3 and 5, the shaft has mounted thereon eccentric cams 42. Mounted within the rail are inverted cam followers 44 having substantially arcuate follower surfaces 46, each of which provides substantial surface area in contact with the surface of a corresponding cam 42. Upon rotation of the shaft 36 from manual actuation of the lever 38 the cam 42 will be forced to pivot about the axis of the rotation of the shaft 36. The cam followers 44 will remain in continous engagement on the surfaces of the cam 42 and will be forced to displace, together with the bars 16 and the contacts 24, toward the card 14. It is desirable in the interest of compactness in the card reader that such displacement be minimized. This can be accomplished by fabricating the cams 42 from lightly polished chrome plated brass. The chrome surface provides a low coefficient of friction and a substantially non-deflecting material. The biasing force of the cams 42 on the cam follower 44 is distributed over a substantial area. The biasing force is thereby translated into displacement of the cam follower with a minimum compression of the cam follower. Since the cam followers engage the cams over a substantial area, the cams are partially encircled by the followers, and the cam followers must be allowed to displace laterally from side to side within the channel 30 as the cams are eccentrically pivoted about the shaft 36. Accordingly, as shown in FIGS. 7 and 5, each cam follower 44 is provided with a generally eliptical recess 48 receiving therein a generally circular metal disc 50. The disc 50 is held in place within the recess 48 by a threaded fastener 52 threadably secured in the channel 30. As the eccentric cams 42 are pivoted about the shaft 36, the cam followers 44 will shift laterally within the channel 30 by displacement of the recessed portions 48 over the discs 50.

As more particularly shown in FIG. 3, before the card 14 is inserted within the slot 12, the contacts 26 are initially in slightly spaced relationship from the printed circuit boards 3 and 28. The clearance defined between the contacts 26 and the boards 3 and 28 allow for receipt of the card 14 therein. To the rail 30 is secured a diagonally projecting leaf spring 54 having thereon a plastic arcuate knob 56 which projects into the clearance between the contacts 26 and the board 3. When the card is inserted into the clearance, the card will be forcibly inserted under the knob 56 which holds the card against the printed circuit board 3 while the card is being read. Plate 4' has thereon a lever switch 29 which is activated by the card to energize the read head circuitry upon full insertion of the card in the reader.

An integral rail 33 bridges between the bearing blocks 32. A block 35 is mounted to the read head 16 and is provided with a coil spring 37 which resiliently biases the read head 16 against the cams 42. An inner plate 39 has thereon a block 41 which carries therein a threaded fastener 43, which is eccentric along its length so as to adjust the position of the read head 16 with respect to the rail 33 from left to right as shown in FIG. 3. As shown more particularly in FIG. 2, a plurality of conducting barrels 58 project outwardly of the ends of the dielectric bars 18. A plurality of connectors 60 having a dielectric housing within which are mounted spring pin contacts (not shown) to which wires 62 are terminated are pluggably received over the pin barrels 58. The wires 62 are thus connected to the pins 58 and provide circuit inputs to the read head.

In addition, FIG. 10 illustrates that the laminated bars 18 have their grooved or recessed portions 20 and 22 thereof cooperating to form pockets or receptacles into which enlarged end portions 64 of the contacts 24 are received. A plurality of printed circuit boards 66 have the edges thereof also received within the portions 22 of the receptacles. The enlarged portions 64 of the contacts electrically engage corresponding circuit paths on the printed circuit boards 66. To insure pressure contact between the contact portions 64 and the printed circuit board paths, resiliently compressible dielectric strips 68 are forcibly received in compression within the portions 20 of the receptacles. More particularly, the strips 20 are compressed against the contact portions 64 deflecting them resiliently in cantilever fashion against the circuit boards 66. Such cantilever deflection assures pressure engagement of the contact portions 64 against the boards 66 to assure good electrical contact therewith. The strips 68 may be in the form of strands, tubes or strips of resilient dielectric material, such as rubber. The compression afforded by the strips 68 assure that the printed circuit boards 66 are firmly retained with considerable friction within the receptacle portions of the bars 18. The printed circuit boards 66 of the present invention carry diodes thereon which provide diode isolation for each of the circuit paths engaged with the contacts 24. The clearances between adjacent boards 66 permit mounting of the diodes to the surfaces of the boards. The boards 66 may also be utilized to carry additional circuit components for the card reader if desired. In addition, the enlarged portions 64 of the contacts 24 are relatively wide to insure compression of the dielectric strips 68. The relatively wide portions 64 may be in the form of hollow barrel portions of the contacts 24 into which wires 70 may be terminated to provide additional electrical inputs to the card reader if desired.

FIG. 11 illustrates that the plurality of dielectric bars 18 may be laminated together to provide a printed circuit board connector. In this embodiment rows of contacts 72 between the laminated bars 18 provide extending pin-type or post-type terminals for pluggable electrical connection externally of the bars 18. Relatively wide portions 74 of the terminals correspond to the relatively wide portions 64 of the terminals shown in FIG. 10. Terminal portions 74 engage in printed circuit paths of a plurality of printed circuit boards 76 which are pluggably received into the receptacle portions 78 of the dielectric members 18. The receptacle portions 78 are formed by elongated recesses in each of the members 18 corresponding to the recessed portions 20 and 22 of the embodiment shown in FIG. 10. The embodiment shown in FIG. 11 also incorporates the use of dielectric strips 68 to insure pressure connection of the terminal portions 74 against the printed circuit boards 76. In addition the printed circuit boards 76 will be firmly retained in the receptacle portions 78 by friction forces provided by compression of the dielectric strips 68. The embodiment of FIG. 11 thus may be utilized as a connector for printed circuit boards in addition to its use in a card reader as heretofore disclosed.

Although preferred embodiments and modifications of the present invention are illustrated other modifications and embodiments are intended to be covered by the scope and spirit of the appended claim.

What is claimed is:

1. In a card reader having a fixed circuit board and a movable read head carrying electrical contacts for engagement on said circuit board and wherein an apertured card is interposed between the contacts and the circuit board such that the card apertures permit communication of selected contacts with the circuit board, the improvement comprising:
    a plurality of dielectric strips on the read head laminated together and sandwiching therebetween the electrical contacts for engagement against said circuit board,
    recessed portions of said dielectric strips defining pockets into which barrel potions of the electrical contacts project,
    printed circuit boards pluggably received in said pockets together with resilient means received in said pockets for biasing the barrel portions of said contacts into electrical engagement on the printed circuit boards and for wedgingly retaining the printed circuit boards in said pockets, and
    electrical wires pluggably connected in said barrel portions for providing electrical inputs to said contacts, the printed circuit boards in said pockets being spaced from each other for receiving electrical circuit components disposed in the spaces between said printed circuit boards.

* * * * *